United States Patent [19]

Yamaguchi

[11] Patent Number: 5,016,494

[45] Date of Patent: May 21, 1991

[54] JOLT CONTROL FOR DRIVE SYSTEM

[75] Inventor: Hiroshi Yamaguchi, Yokohama City, Japan

[73] Assignee: Nissan Motor Co., Ltd., Yokohama City, Japan

[21] Appl. No.: 390,907

[22] Filed: Aug. 8, 1989

[30] Foreign Application Priority Data

Aug. 8, 1988 [JP] Japan .................. 63-196076

[51] Int. Cl.$^5$ ........................................... B60K 41/18
[52] U.S. Cl. ........................................ 74/858; 74/857; 74/866
[58] Field of Search ............... 74/854, 855, 857, 858, 74/866

[56] References Cited

U.S. PATENT DOCUMENTS

| | | | |
|---|---|---|---|
| 4,493,228 | 1/1985 | Vukovich et al. | 74/858 |
| 4,638,690 | 1/1987 | Hattori et al. | 74/866 |
| 4,680,992 | 7/1987 | Hayasaki et al. | 74/869 |
| 4,688,450 | 8/1987 | Hayashi et al. | 74/858 X |
| 4,807,497 | 2/1989 | Yasue et al. | 74/867 |
| 4,811,224 | 3/1989 | Kuerschner et al. | 364/424 |
| 4,819,187 | 4/1989 | Yasue et al. | 364/431.01 |

FOREIGN PATENT DOCUMENTS

| | | |
|---|---|---|
| 228899 | 7/1987 | European Pat. Off. . |
| 0013062 | 2/1977 | Japan ................... 74/854 |
| 58-77138 | 5/1983 | Japan . |
| 60-27757 | 2/1985 | Japan . |
| 61-113526 | 5/1986 | Japan . |

OTHER PUBLICATIONS

Nissan Full-Range Automatic Transmission RE4R01A Type, Service Manual, 1987.

Primary Examiner—Dirk Wright
Attorney, Agent, or Firm—Foley & Lardner

[57] ABSTRACT

A jolt control system is disclosed wherein an output torque alteration control is effected when an automatic transmission undergoes a gear shift operation and the output torque alteration control is suspended upon detecting a predetermined change in throttle opening degree of a throttle valve of an engine.

6 Claims, 9 Drawing Sheets

JOLT CONTROL FOR DRIVE SYSTEM

BACKGROUND OF THE INVENTION

The present invention relates to a jolt control for a drive system including a prime mover with an accelerator pedal, and an automatic transmission.

Figure 12:
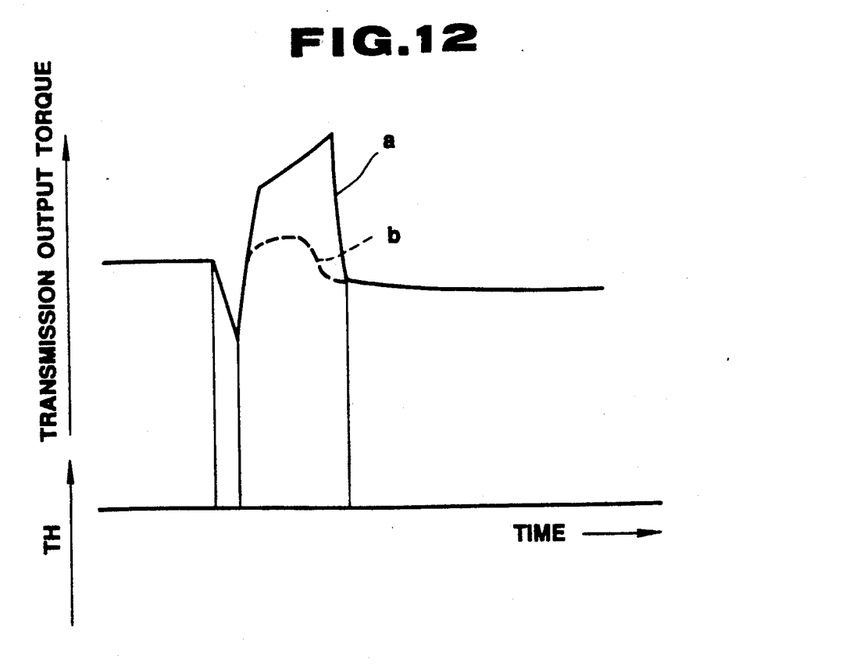

An automatic transmission is shiftable between two gear positions by hydraulically activating friction elements selectively. The quality of a shift operation in the automatic transmission may be evaluated by inspecting a waveform of the transmission output torque. FIG. 12 shows in the fully drawn curve a a waveform of the transmission output torque which induces a substantial shift shock during a gear shift operation with the throttle valve kept at a constant throttle opening degree.

It is proposed in Japanese Patent Application Kikai No. 58-77138 to reduce shift shock during a gear shift operation by reducing the output torque of the prime mover during a gear shift operation. This proposal is intended to reduce the peak of the transmission output torque during the gear shift operation for shock reduction by reducing the output torque of the prime mover. In FIG. 12, a dotted lines curve b shows a waveform of the transmission output torque during the gear shift operation where the proposal above is applied.

Figure 11:
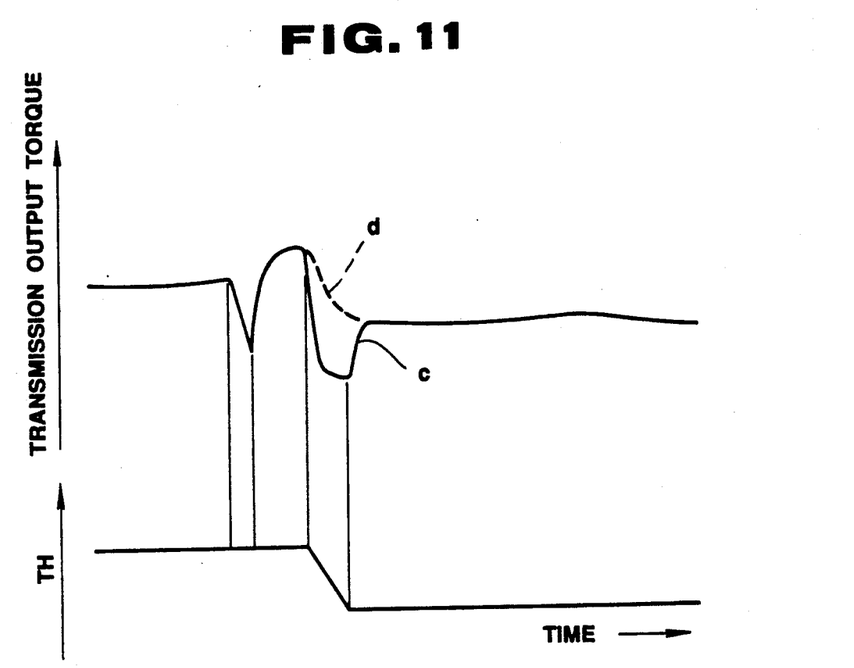
FIGS. 11 and 12 are transmission output torque waveforms used in explaining shocks during a gear shift operation.

When the accelerator pedal is released to decrease the throttle opening degree TH, as shown in FIG. 11, in the course of the torque-down operation for shock reduction, however, a torque drop c occurs due to an additional prime mover torque reduction, inducing an additional shock owing to a difference between the bottom of this torque drop c and the transmission output torque obtained after the gear shift operation.

An object of the present invention is to improve a jolt control system of the above kind such that the occurrence of an additional shock of the above kind is suppressed.

SUMMARY OF THE INVENTION

According to the present invention, there is provided a jolt control system wherein, during a gear shift operation, a torque-change control for causing such a temporal alteration of an engine output torque as to reduce shift shock is prohibited in response to a change in depression degree of an accelerator pedal during the gear shift operation.

According to one aspect of the present invention, there is provided a jolt control system for a drive system including a prime mover provided with manually operable means for controlling output torque of the prime mover, and an automatic transmission, comprising:

sensor means for sensing a position of the manually operable output torque controlling means and generating an output signal indicative of said position sensed;

means for effecting an output torque alteration control, wherein the output torque of the prime mover is altered, when the automatic transmission undergoes a gear shift operation; and means for detecting a predetermined change in said output signal when the automatic transmission undergoes the gear shift operation and rendering said output torque alteration control effecting means inoperable upon detecting said predetermined change.

According to another aspect of the present invention, there is provided a jolt control method for a drive system including a prime mover provided with manually operable means for controlling output torque of the prime mover, and an automatic transmission, comprising:

sensing a position of the manually operable output torque controlling means and generating an output signal indicative of said position sensed;

effecting an output torque alteration control, wherein the output torque of the prime mover is altered, when the automatic transmission undergoes a gear shift operation; and detecting a predetermined change in said output signal when the automatic transmission undergoes the gear shift operation and rendering said output torque alteration control inoperable upon detecting said predetermined change.

DETAILED DESCRIPTION OF THE INVENTION

Hereinafter, the invention will be described in detail with reference to the drawings.

Figure 1:
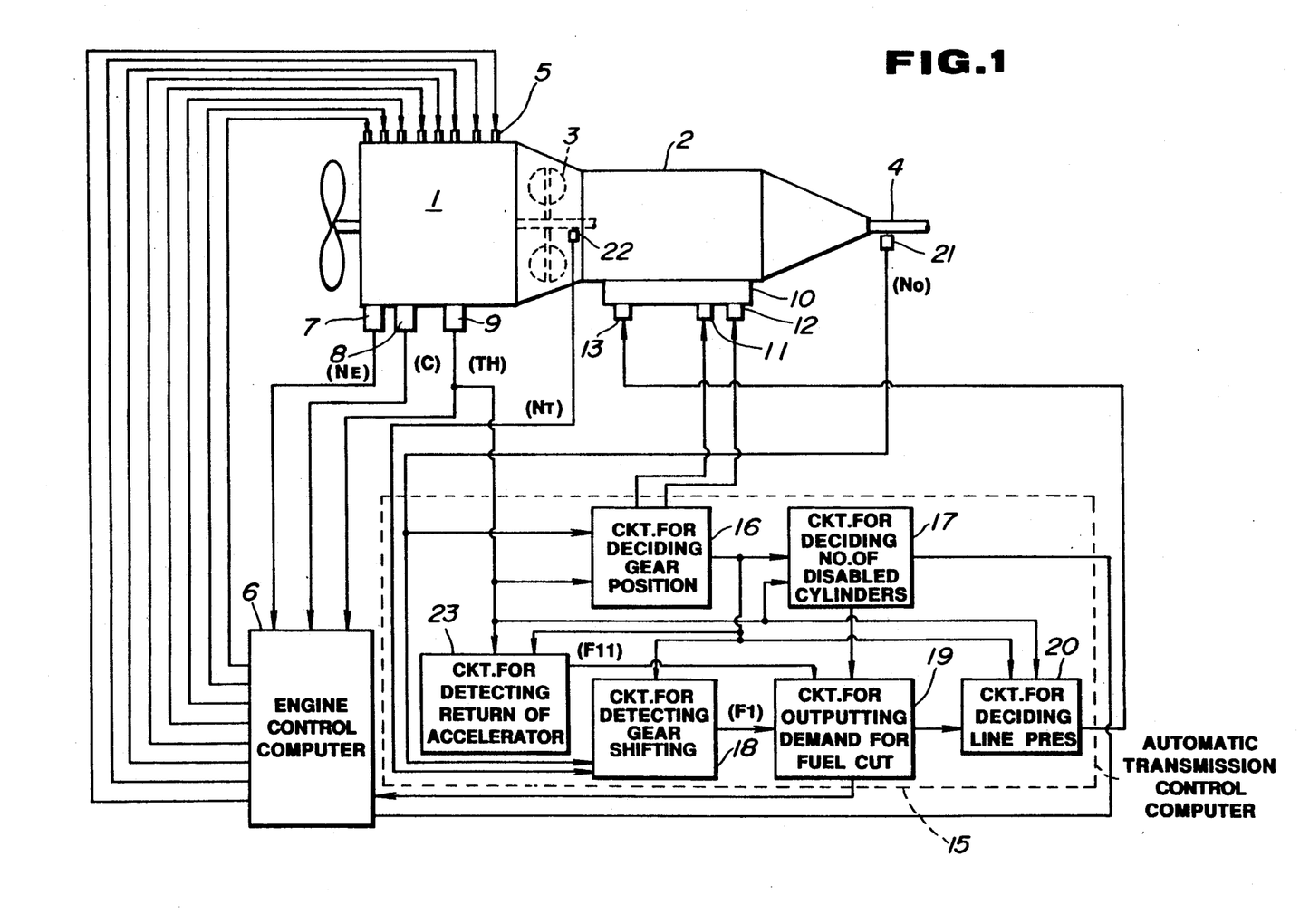
FIG. 1 is a block diagram of a drive system with a jolt control system according to the present invention.

FIG. 1 shows one embodiment of a jolt control system according to the invention, in which 1 denotes an engine serving as a prime mover and 2 denotes an automatic transmission. The power of the engine 1 is delivered through a torque converter 3 to the automatic transmission 2, which allows delivery of the power to a transmission output shaft 4 in a manner to drive the driving wheels of the vehicle in accordance with a gear ratio provided by the gear position established in the automatic transmission.

The engine 1 may be an eight-cylinder engine having eight fuel injection valves 5 for eight cylinders, respectively. These fuel injection valves 5 are opened or closed by an engine control computer 6. The computer 6 calculates and determines the amount of fuel to be injected in response to an engine speed indicative signal sent from an engine speed sensor 7 which detects the engine crankshaft revolution speed $N_E$, an engine coolant temperature indicative signal from an engine coolant temperature sensor 8 which detects a temperature C of an engine coolant, and a throttle opening degree indicative signal from a throttle sensor 9 which detects a throttle opening degree TH representative of an engine load. Then, the computer 6 operates to individually open each fuel injection valve 5 for a duration of time which is variable with variation in engine revolution speed $N_E$ for allowing fuel to be injected to the corresponding cylinder of the engine 1. When the output torque of the engine 1 is reduced while the automatic transmission 2 undergoes a gear shift operation, a fuel supply to some cylinder or cylinders is cut to disable the same.

The automatic transmission 2 has a control valve assembly 10. The control valve assembly 10 has a first shift solenoid 11, a second shift solenoid 12, and a line pressure solenoid 13. The shift solenoids 11 and 12 are rendered ON (energized) and/or OFF (deenergized) or vice versa in a manner as tabulated in Table 1, as follows:

TABLE 1

|  | First Shift Solenoid 11 | Second Shift Solenoid 12 |
| --- | --- | --- |
| First Speed | ON | ON |
| Second Speed | OFF | ON |
| Third Speed | OFF | OFF |
| Fourth Speed | ON | OFF |

In this case, the servo activating hydraulic pressure for respective friction elements is a line pressure which is generated as a result of pressure regulation under the control of the line pressure solenoid 13 that is duty controlled. During a gear shift operation, the capacity of a friction element to be hydraulically activated is controlled by temporarily modulating the line pressure.

The on-off control of the solenoids 11, 12 and the duty control of the line pressure solenoid 13 are executed by an automatic transmission control computer 15. The computer 15 performs various functions which may be illustrated by circuits or stages 16, 17, 18, 19, 20, and 23 for deciding gear position, for deciding number of disabled cylinders by fuel-cut, for detecting gear shifting, for outputting demand for fuel-cut, for deciding line pressure, and for detecting return of an accelerator, respectively.

The automatic transmission mentioned above is of the RE4R01A type described in "NISSAN FULL-RANGE AUTOMATIC TRANSMISSION RE4R-01A TYPE, SERVICE MANUAL, (A261C07)" issued on Mar. 1987 by NISSAN MOTOR COMPANY LIMITED. The automatic transmission of the above mentioned type is also disclosed in U.S. Pat. No. 4,680,992 (Hayasaki et al.) which is hereby incorporated in its entirety by reference.

In order to make clear the functions attributed to the circuits or stages shown in FIG. 1 enclosed by block drawn by broken lines, the flowcharts shown in FIGS. 2, 4, 6, 7, and 8 are explained although these programs are stored in a read only memory (ROM) of the automatic transmission control computer 15 and executed under the control of a central processing unit (CPU).

At the circuit or stage 16, a desired shift operation in gear position is determined by looking up a predetermined shift pattern table using the throttle opening degree indicative signal TH (engine load) and the transmission output shaft revolution speed indicative signal $N_O$ (vehicle speed) and controls the ON/OFF state of the shift solenoids 11 and 12 to establish the gear position desired.

Figure 2:
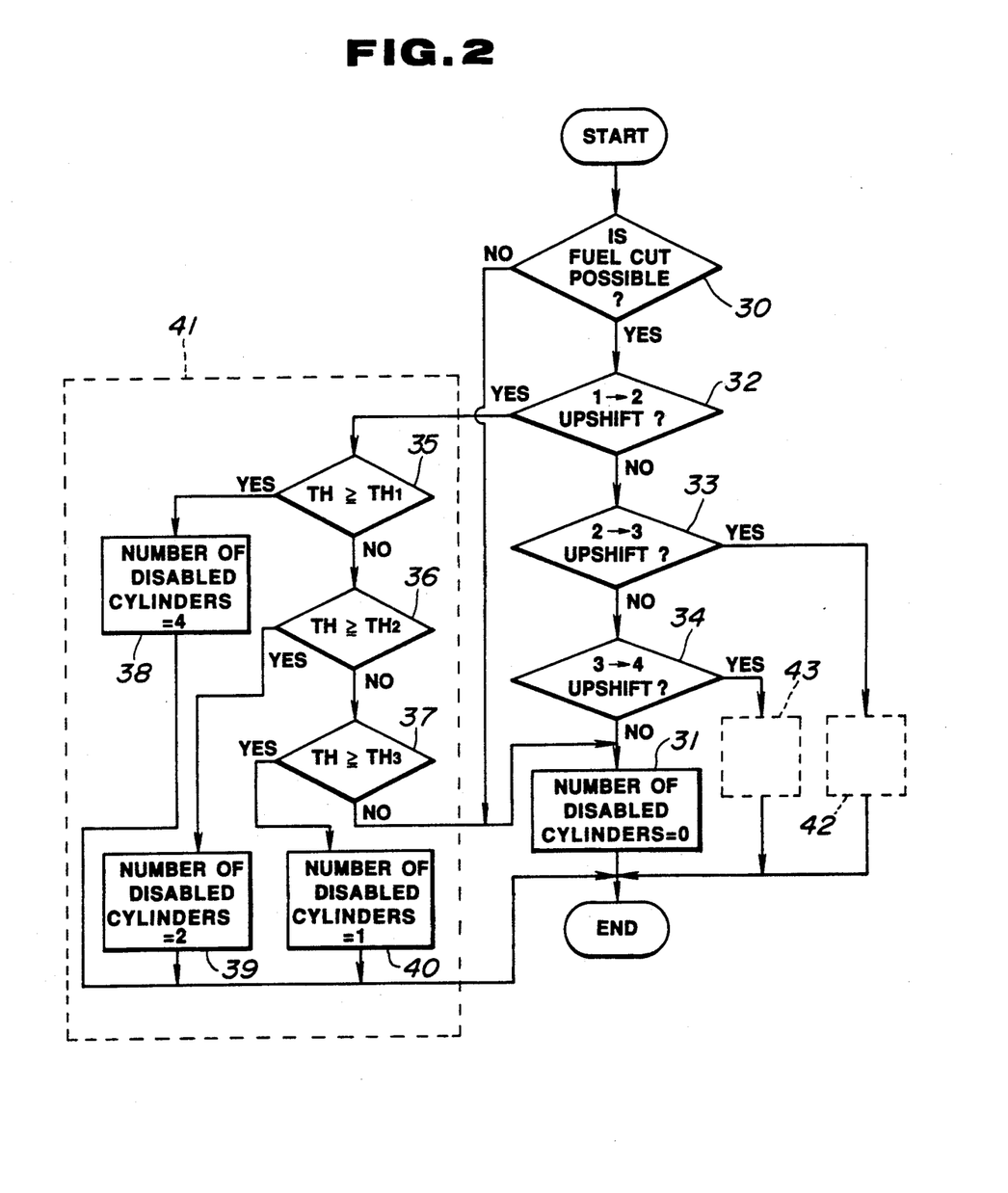
FIG. 2 is a flowchart of a program for determining the number of cylinders to be disabled by fuel-cut operation.

Referring to the flowchart shown in FIG. 2, the function of the circuit or stage 17 is explained. Supplied to this stage 17 are the signal indicative of the desired shift determined at the circuit 16, the throttle opening degree indicative signal TH from the sensor 9, and a fuel-cut enabe signal TH from the engine control computer 6. In FIG. 2, at a step 30, it is determined whether the fuel-cut operation is possible or not by checking whether or not a fuel-cut enable signal is issued by the engine control computer 6 or not. The engine control computer 6 checks whether or not the engine speed $N_E$ is greater than or equal to a predetermined value, a coolant temperature C is higher than or equal to a predetermined value, and issues the fuel-cut enable signal when conditions are met for fuel-cut operation. If it is determined that the fuel-cut operation is not possible, the number of cylinders to be disabled (viz., disabled cylinder) is set to zero at a step 31. If possible, the program proceeds to steps 32 to 34 to determine which of different types of gear shift the desired shift determined at the stage 16 belongs to. If the desired shift determined at the stage 16 is a downshift or no shift is required, the program proceeds through all of the stages 32, 33 and 34 to the step 31 where the number of disabled cylinders is set to 0 (zero) since the engine output reduction control is not required.

Figure 3:
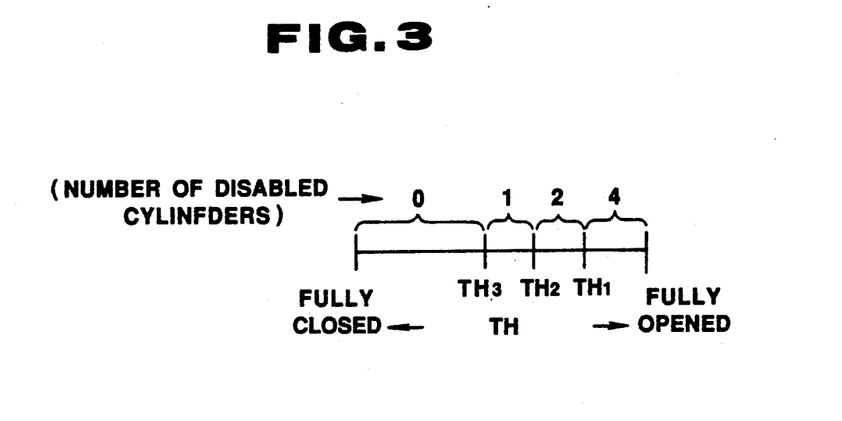
FIG. 3 is a diagram illustrating the number of disabled cylinders versus variation in throttle opening degree (TR)

If the desired shift determined is found to be a 1–2 upshift at the step 32, it is determined at steps 35 to 37 which of four regions the throttle opening degree TH falls in. As shown in FIG. 3, these four regions correspond to different numbers of disabled cylinders, respectively, and thus used for evaluating the number of disabled cylinders for effective reduction of shift shock during the 1–2 upshift operation. If $TH \geq TH_1$, the number of disabled cylinders is set to 4 at a step 38 to allow the fuel-cut to four cylinders. In the case of $TH_1 > TH \geq TH_2$, the number of disabled cylinders is set to 2 at a step 39 to allow fuel-cut to two cylinders. If $TH_2 > TH \geq TH_3$, the number of disabled cylinders is set to 1 at a step 40 to allow the fuel-cut to one cylinder. If $TH < TH_3$, the number of disabled cylinders is set to 0 (zero) at the step 31 to prohibit fuel-cut operation.

If the desired shift determined at the stage 16 is found to be a 2–3 upshift at the step 32 or a 3–4 upshift at the step 34, a similar control to the control enclosed by a block 41 is executed at a step 42 or 43, although $TH_1$, $TH_2$ and $TH_3$ are set to different values. As is now be appreciated, the different numbers of disabled cylinders are set for different types of shift operations in order to effectively reduce the shift shock, respectively.

Figure 4:
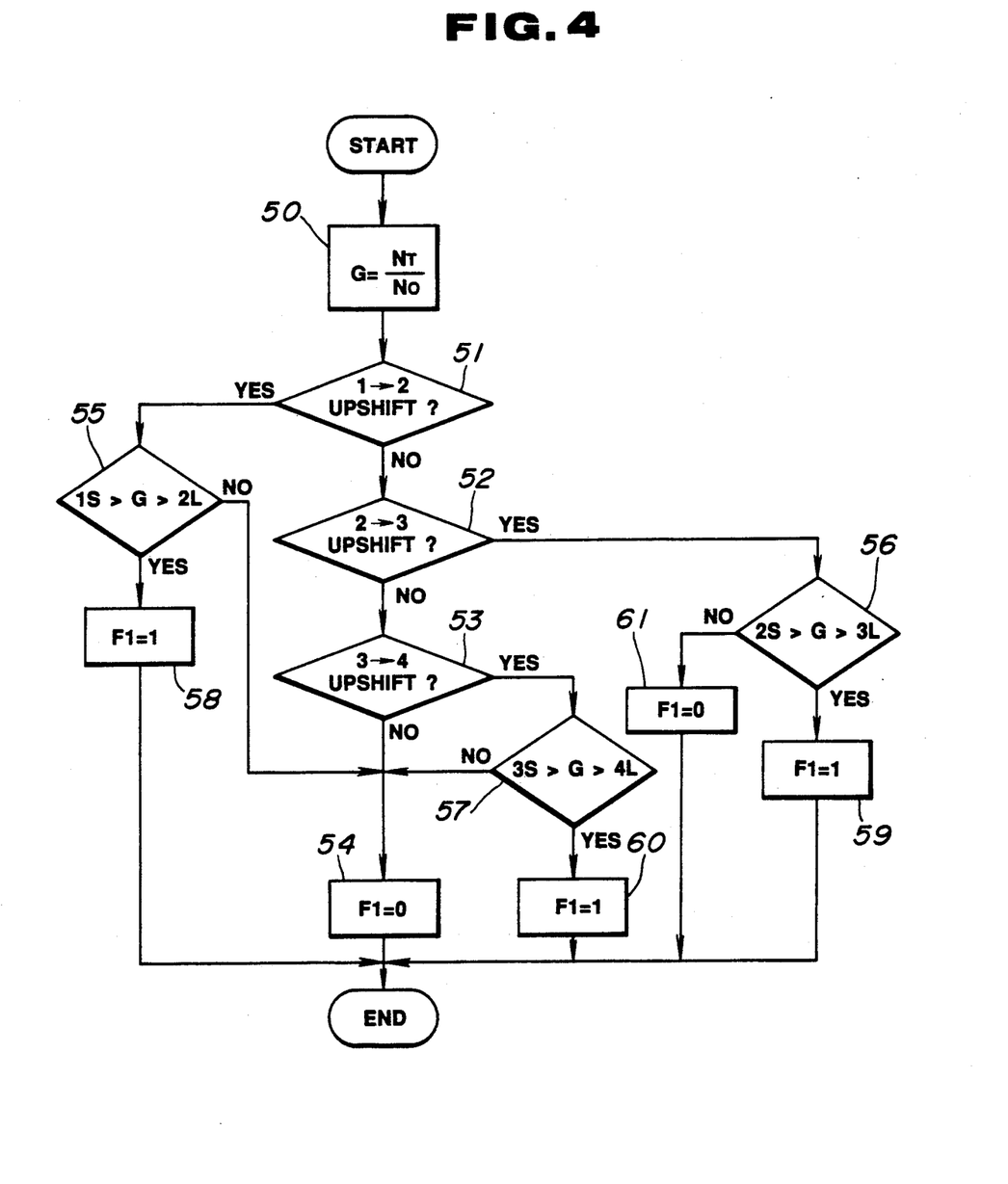
FIG. 4 is a flowchart of a program for detecting whether the automatic transmission undergoes a gear shift operation or not.
Figure 5:
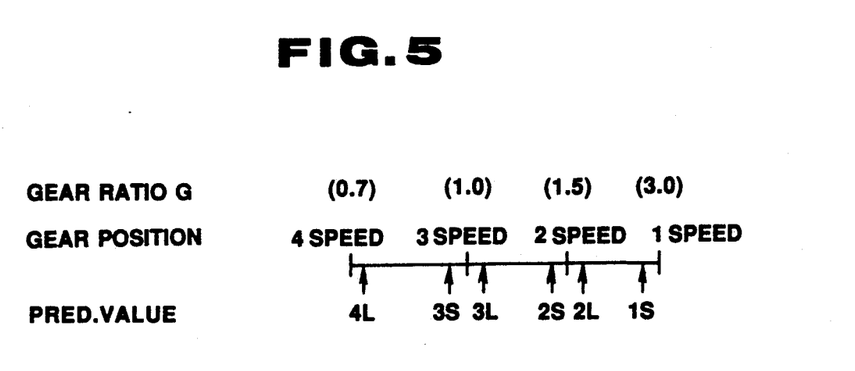
FIG. 5 is a diagram used in explaining how to detect a gear shift operation.

Referring to FIG. 4, the function of detecting gear shift operation performed at the stage 18 is explained. Supplied to this stage 18 are the transmission input shaft revolution speed $N_T$, the transmission output shaft revolution speed $N_O$ and the desired shift determined at the stage 16. In FIG. 4, at a step 50, an apparent gear ratio $N_T/N_O$ is calculated. Then, the type which the desired shift determined at the stage 16 belongs to is evaluated at steps 51 to 53. If the desired shift determined at the stage 16 is found to be a downshift or no shift is required, it is unnecessary to reduce the engine output during the shift operation. Thus, a flag F1 indicating that the shift operation is under progress is reset to 0 (zero). If the desired shift is any one of a 1-2 upshift, a 2-3 upshift, or a 3-4 upshift, the gear ratio G is checked in comparison with predetermined values 3S and 4L in the case of 3-4 upshift, 2S and 3L in the case of 2-3 upshift, and 1S and 2L in the case of 1-2 upshift, at the corresponding one of steps 55, 56, and 57 to determine whether or not the upshift operation progresses. Reference should be made to FIG. 5 in this regard. If it is determined that the upshift operation is under progress, the flag F1 is set to 1 at the corresponding step 58 or 59 or 60. If it is found that the upshift operation is not yet initiated or completed, the flag F1 is reset to zero at the corresponding step 54 or 61.

Figure 6:
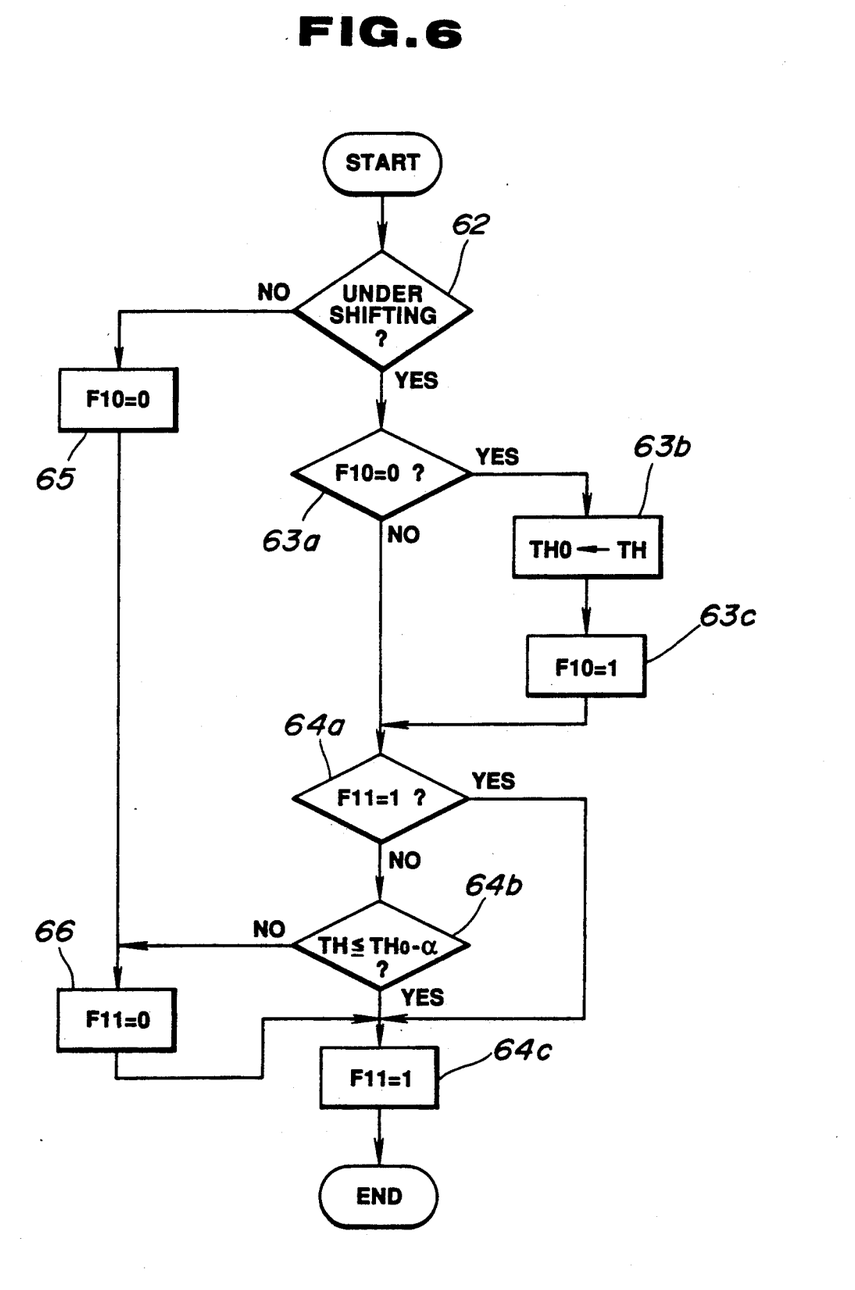
FIG. 6 is a flowchart of a program for detecting a change in throttle opening degree (TH) during a gear shift operation.

The function of the accelerator pedal return detecting circuit or stage 23 shown in FIG. 1 is now explained along with the flowchart shown in FIG. 6.

Referring to FIG. 6, the function of this stage 23 to detect whether or not the accelerator pedal has been returned is explained. Supplied to this stage 23 are the throttle opening degree TH fed thereto from the sensor 9 and the desired shift fed thereto from the stage 16. In FIG. 6, at the step 62, a determination is made as to whether or not the automatic transmission undergoes a gear shift operation. If the answer to this question is "yes", then the program proceeds to the steps 63a–63c where the throttle opening degree TH is set as a value THO for the initiation of the gear shift operation, the value is stored in the memory, and a flag F10 is set to 1 indicating that the value is stored in the memory. Following this the program proceeds from the step 63a to 64a.

At the steps 64a–64c, a determination is made as to whether or not the throttle opening degree TH is equal to or less than the value THO minus a predetermined value $\alpha$ (alpha) or whether the accelerator pedal is released during the gear shift operation. If the accelerator pedal is released during the gear shift operation, then a flag F11 is set to 1. It is to be noted that these operations are performed only once when the accelerator pedal is released during the gear shift operation and, thereafter, the steps 64b and 64c are jumped so that the flag F11 remaines at 1.

If the automatic transmission is not in the course of a gear shift operation, then the program proceeds from the step 62 to the step 65 where the flag F10 is cleared to 0 and then to the step 66 where the flag F11 is cleared to 0.

Figure 7:
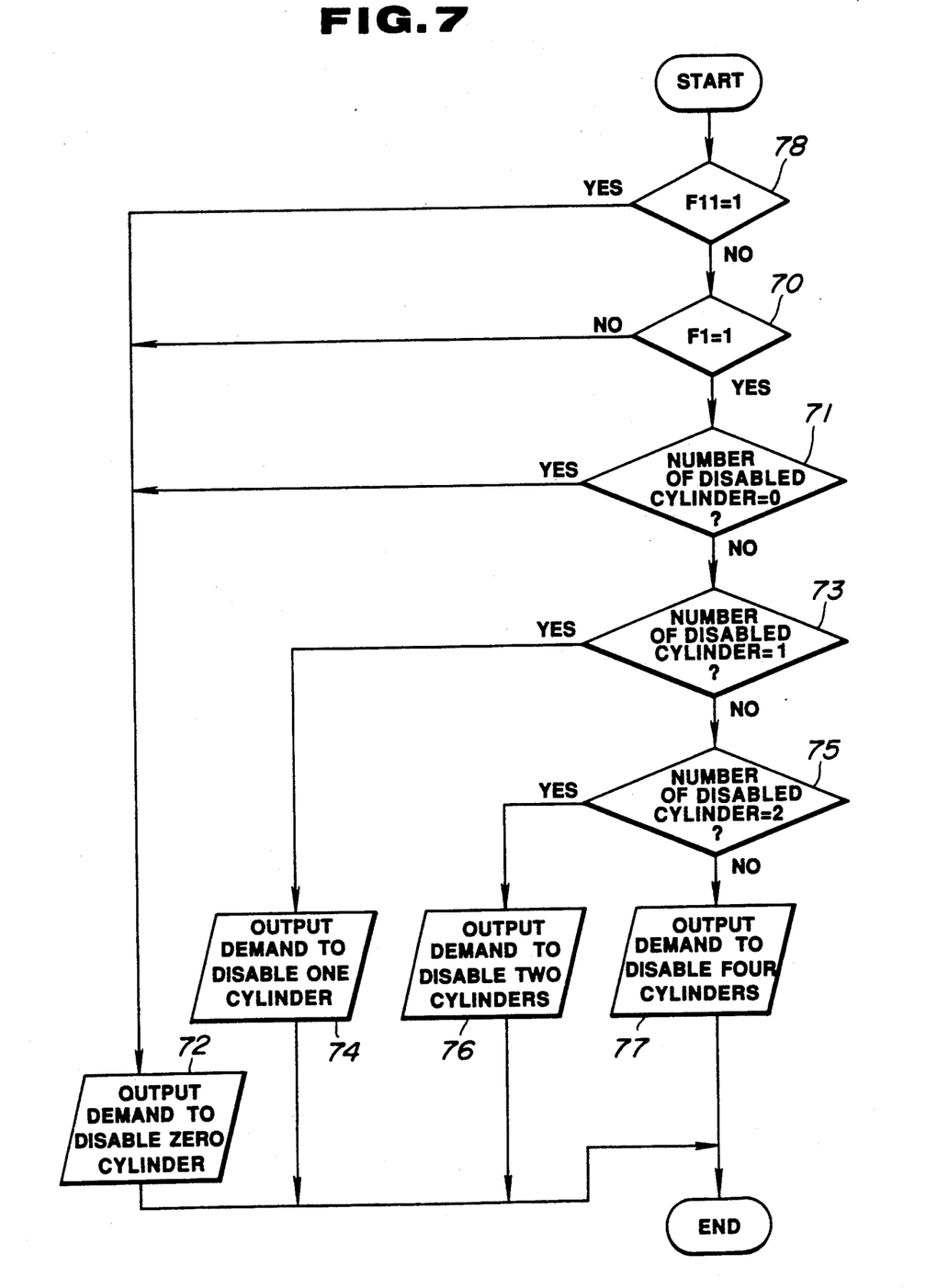
FIG. 7 is a flowchart of a program for outputting demand for fuel-cut.

Referring to FIG. 7, the function to output demand for fuel-cut operation performed at the circuit or stage 19 is explained. The demand for fuel-cut operation is fed to the engine control computer 6 to cut fuel supply to some of the cylinders of the engine 1 thereby to urge the engine 1 to reduce output torque thereof. Supplied to the stage 19 are a signal indicative of the status of the flag F11 fed thereto from the stage 23, a signal indicative of the status of the flag F1 fed thereto from the stage 18 and a signal indicative of the number of disabled cylinders set at the stage 17. In FIG. 7, at the step 78, a determination is made as to whether or not $F1_1=1$ indication that the acclerator pedal is released during the gear shift operation. If the answer to this question in "no", then the program proceeds to another determination step 70. This determination is as to whether or not F1=1 indicating that the automatic transmission is in the course of an upshift operation during which an engine output reduction is required to reduce shocks. If the accelerator pedal is released during the gear shift operation, or the automatic transmission is not in the course of an upshift operation, or the fuelcut cylinder number is zero, then the program proceeds from the step 78, 70 or 71 to the step 72 where no command is produced to the computer 6 so that the engine operates on all cylinders. If the fuelcut cylinder number is 1, then the program proceeds from the step 73 to the step 74 where a command is produced to cause the computer 6 to terminate the fuel delivery to one cylinder. If the fuelcut cylinder number is 2, then the program proceeds to the step 75 to the step 76 where a command is produced to cause the computer 6 to terminate the fuel delivery to two cylinders. If the fuelcut cylinder number is 4, then the program proceeds from the step 75 to the step 77 where a command is produced, causing the computer 6 to terminate the fuel delivery to four cylinders. The computer 6 responds to one of such commands by closing fuel injectors to terminate the fuel delivery to the corresponding cylinders so as to reduce the engine output torque during the upshift operation.

Figure 8:
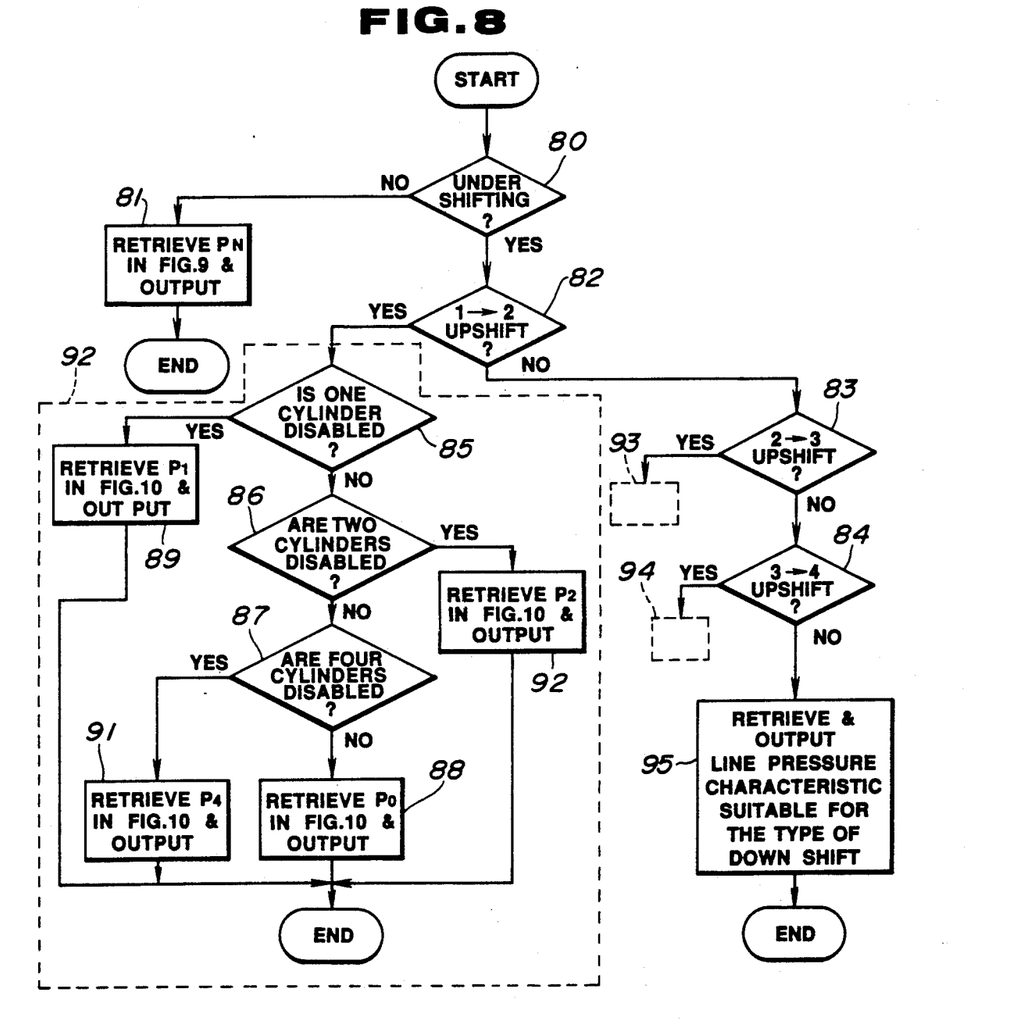
FIG. 8 is a flowchart of a program for deciding the line pressure magnitude in accordance with the amount by which the prime mover drops the output torque thereof during a gear shift operation.
Figure 9:
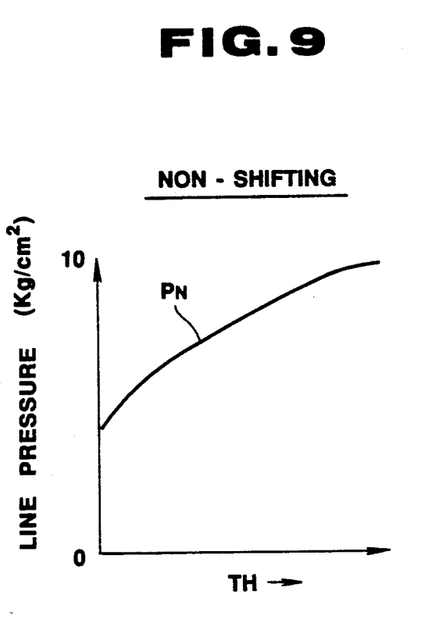
FIG. 9 is a graph showing the line pressure characteristic for non-shifting.
Figure 10:
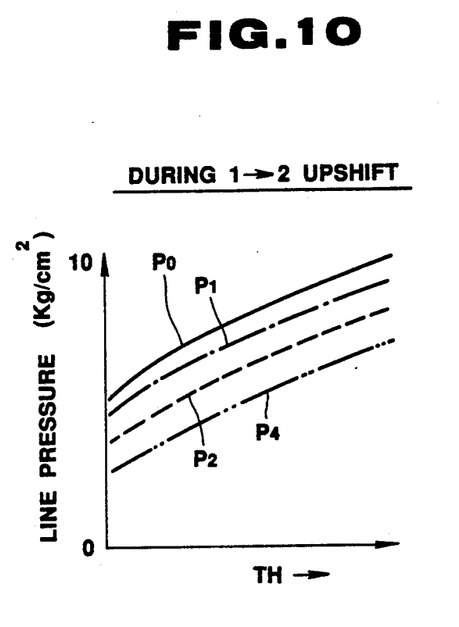
FIG. 10 is a graph showing different line pressure characteristics for different amounts by which the prime mover drops the output torque thereof during a 1-2 upshift operation.

Referring to FIG. 8, the function to deciding the magnitude or level of the line pressure (servo activating hydraulic fluid pressure) performed at the stage or circuit 20 is explained. At the stage 20, the driving duty of the line pressure solenoid 13 is determined. Supplied to the stage 20 are the desired shift indicative signal from the stage 16, the throttle opening degree indicative signal TH and the signal indicative of the number of disabled cylinders used in the stage 19. In FIG. 8, at a step 80, it is determined whether the automatic transmission 2 is under upshifting or not by checking the gear ratio G. If the transmission is not under shifting, the program proceeds to a step 81 where a table look-up operation of the characteristic $P_N$ shown in FIG. 9 is conducted using the throttle opening degree TH to retrieve a line pressure data in terms of duty factor to be supplied to the line pressure solenoid 13. If it is determined at the step 80 which one of the three types of upshifting operations, namely a 1-2 upshift, a 2-3 upshift and a 3-4 upshift, is under progress, the program proceeds toward steps 82, 83, and 84 where the type of the shifting now under progress is checked. If it is determined at the step 82 that the 1-2 upshift is under progress, the program proceeds toward the steps 85, 86 and 87 where the number of disabled cylinders is checked. If the number of disabled cylinders is 0 (zero), the program proceeds down to a step 88 where a table look-up operation of the line pressure characteristic $P_0$ shown in FIG. 10 is conducted using the throttle opening degree TH to retrieve an appropriate line pressure data in terms of a duty factor to the line pressure solenoid 13. If it is determined at the step 85 that the number of disabled cylinder is 1, the program proceeds to a step 89 where a table look-up operation of the line pressure characteristic $P_1$ shown in FIG. 9 is performed using the throttle opening degree TH to retrieve an appropriate data in terms of duty factor to the line pressure solenoid 13. If it is determined that the number of disabled cylinders is 2 at the step 86 or 4 at the step 87, a table look-up operation of the corresponding line pressure characteristic $P_2$ or $P_4$ shown in FIG. 9 is preformed using the throttle opening degree TH to retrieve an appropriate data in terms of duty factor to the line pressure solenoid 13. Thus, the line pressure solenoid 12 is operated on the duty factor determined at the step 81, 88, 89, 91, or 92 to bring the magnitude of the line pressure into agreement with the corresponding one of the line pressure characteristics.

In such a manner, the line pressure control is performed according to the number of the disabled cylinders (engine output torque reduction) during the 1-2 upshift operation. It is, therefore, possible to control the capacity of the friction element operated during the gear shift operation according to the output torque and to reduce shock during the 1-2 upshift operation by the engine output torque reduction and the corresponding friction element capacity control. Since the capacity control corresponds to the torque reduction, it is possible to ensure shock reduction during the gear shift operation and prevent the friction element from being damaged due to an insufficient friction element capacity.

If the desired gear shift operation is a 2-3 upshift or a 3-4 upshift, then the program of FIG. 8 proceeds from the steps 83 or 84 to the steps in the block 93 or 94 which are substantially the same as the steps in the block 92 except for the line pressure characteristic curves. In such a manner, it is possible to reduce shocks during the 2-3 or 3-4 upshift operation like the 1-2 upshift operation.

If the desired gear shift operation is a downshift, then the program proceeds from the step 84 to the step 95 where an appropriate line pressure characteristic curve is selected according to the kind of the downshift operation. An appropriate value of the duty ratio for the solenoid 13 is calculated from the selected line pressure characteristic curve which defines it as a function of throttle position and the calculated duty ratio value is transferred to control the solenoid 13.

If the accelerator pedal is returned during the gear shift operation, then the program of FIG. 7 proceeds from the step 78 to the step 72 where the engine output torque reduction control is inhibited. If the engine output reduction control is continued in spite of the fact that the engine output torque decreased due to return of the acceleration pedal during the gear shift operation, a torque reduction c will occur, as described previously in connection with FIG. 11, causing an additional shock during the gear shift operation. Since such a torque reduction control is inhibited, it is possible to avoid such a problem.

What is claimed is:

1. In a drive system including a prime mover provided with manually operable means for controlling output torque of the prime mover, and an automatic transmission, the automatic transmission undergoing a gear shift operation, a jolt control system for the automatic transmission when the automatic transmission undergoes the gear shift operation, comprising:

sensor means for sensing a position of the manually operable output torque controlling means and generating an output signal indicative of said position sensed;

means for effecting an output torque alteration control, wherein the output torque of the prime mover is altered, when the automatic transmission undergoes the gear shift operation: and means for detecting a predetermined change in said output signal when the automatic transmission undergoes the gear shift operation and rendering said output torque alteration control effecting means inoperable upon detecting said predetermined change, whereby the automatic transmission undergoes the gear shift operation without the output torque alteration control.

2. A jolt control system as claimed in claim 1, wherein said output torque alteration control includes a torque-down control, wherein the output torque of the prime mover is reduced, when the automatic transmission undergoes an upshift operation.

3. A jolt control system as claimed in claim 1, wherein said sensor means include means for detecting a throttle opening degree of a throttle valve of the prime mover operatively connected to the accelerator.

4. A jolt control system as claimed in claim 1, wherein said means for detecting said predetermined change in said output signal include a predetermined indicator which is set upon detecting said predetermined change.

5. In a drive system including a prime mover provided with manually operable means for controlling output torque of the prime mover, and an automatic transmission, the automatic transmission undergoing a gear shift operation, a jolt control method for the automatic transmission when the automatic transmission undergoes the gear shift operation comprising the steps of:

sensing a position of the manually operable output torque controlling means and generating an output signal indicative of said position sensed;

effecting an output torque alteration control, wherein the output torque of the prime mover is altered, when the automatic transmission undergoes the gear shift operation;

detecting a predetermined change in said output signal when the automatic transmission undergoes the gear shift operation; and rendering said output torque alteration control inoperable upon detecting said predetermined change, whereby the automatic transmission undergoes the gear shift operation without the torque alteration control.

6. In a vehicle engine drive system provided with manually operable means for controlling the output torque of the engine and an automatic transmission, a jolt control system for the automatic transmission when the automatic transmission undergoes a gear shifting operation, comprising:

first sensor means for detecting a change in engine torque as a result of a gear shifting operation;

second sensor means for detecting the throttle opening position of the engine;

third sensor means for detecting engine performance parameters, including engine speed and temperature; and a central processing unit for receiving the outputs of the first, second and third sensors and generating signals to control the supply of fuel to each cylinder so as to eliminate jolt from manual gear shifting under high engine torque conditions, the central processing unit cutting off the supply of fuel to selected cylinders of the engine.

* * * * *